(12) United States Patent
Maus et al.

(10) Patent No.: US 9,057,306 B2
(45) Date of Patent: Jun. 16, 2015

(54) DEVICE FOR DELIVERING REDUCING AGENT AND MOTOR VEHICLE HAVING THE DEVICE

(71) Applicant: EMITEC Gesellschaft fuer Emissionstechnologie mbH, Lohmar (DE)

(72) Inventors: Wolfgang Maus, Bergisch Gladbach (DE); Ludwig Wieres, Overath (DE); Rolf Brueck, Bergisch Gladbach (DE); Peter Hirth, Roesrath (DE); Jan Hodgson, Troisdorf (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 69 days.

(21) Appl. No.: 13/662,597

(22) Filed: Oct. 29, 2012

(65) Prior Publication Data

US 2013/0047587 A1 Feb. 28, 2013

Related U.S. Application Data

(63) Continuation of application No. PCT/EP2011/056433, filed on Apr. 21, 2011.

(30) Foreign Application Priority Data

Apr. 28, 2010 (DE) .......................... 10 2010 018 613

(51) Int. Cl.
*F01N 3/00* (2006.01)
*F01N 3/20* (2006.01)

(52) U.S. Cl.
CPC ........... *F01N 3/2066* (2013.01); *F01N 2610/14* (2013.01); *F02M 2200/315* (2013.01); *Y02T 10/24* (2013.01)

(58) Field of Classification Search
CPC ... F01N 3/2066; F01N 2610/14; Y02T 10/24; F02M 2200/315
USPC ........................................ 60/295; 137/565.01
See application file for complete search history.

(56) References Cited

U.S. PATENT DOCUMENTS

2009/0205735 A1 8/2009 Schmelter et al.
2011/0047996 A1 3/2011 Garcia-Lorenzana Merino et al.

FOREIGN PATENT DOCUMENTS

DE 199 47 198 A1 4/2001
DE 102006050945 A1 4/2008
(Continued)

OTHER PUBLICATIONS

English translation of German Patent Application Publication No. DE 19947198 A1 (Apr. 5, 2001).*
(Continued)

*Primary Examiner* — Jason Shanske
(74) *Attorney, Agent, or Firm* — Laurence A. Greenberg; Werner H. Stemer; Ralph E. Locher

(57) ABSTRACT

A device for delivering reducing agent from a tank to a metering unit includes a pulsating delivery pump for delivering reducing agent in a delivery direction through a delivery line from the tank to the metering unit. The delivery line includes at least two separate ducts in regions downstream of the delivery pump in the delivery direction. The ducts form flow paths having different propagation times for the reducing agent. This leads, in particular, to cost-effective noise reduction for such delivery systems. A motor vehicle having the device is also provided.

12 Claims, 3 Drawing Sheets

(56) References Cited

FOREIGN PATENT DOCUMENTS

| EP | 0848202 A1 | 6/1998 |
| EP | 1 030 052 A1 | 8/2000 |
| EP | 1030052 A1 | 8/2000 |
| GB | 2265959 A | 10/1993 |
| JP | 2003502568 A | 1/2003 |
| JP | 2008223639 A | 9/2008 |
| WO | 0079108 A1 | 12/2000 |
| WO | 2009/112294 A1 | 9/2009 |

OTHER PUBLICATIONS

English translation of European Patent Application Publication No. EP 1030052 A1 (Aug. 23, 2000).*
International Search Report of PCT/EP2011/056433.

* cited by examiner

DEVICE FOR DELIVERING REDUCING AGENT AND MOTOR VEHICLE HAVING THE DEVICE

CROSS-REFERENCE TO RELATED APPLICATION

This is a Continuation, under 35 U.S.C. §120, of copending International Application No. PCT/EP2011/056433, filed Apr. 21, 2011, which designated the United States; this application also claims the priority, under 35 U.S.C. §119, of German Patent Application DE 10 2010 018 613.9, filed Apr. 28, 2010; the prior applications are herewith incorporated by reference in their entirety.

BACKGROUND OF THE INVENTION

1. Field of the Invention

The invention relates to a device for delivering reducing agent from a tank to a metering unit. Such delivery devices are increasingly used, in particular in the case of mobile internal combustion engines, for delivering reducing agent into an exhaust-gas treatment device. The invention also relates to a motor vehicle having the device.

Exhaust-gas treatment devices with which a reducing agent is injected into an exhaust line are used for the purification of exhaust gases of internal combustion engines. In exhaust-gas treatment devices of that type, a purification of the exhaust gases takes place through the conversion of pollutant constituents of the exhaust gas with the supplied reducing agent. A particularly commonly used method is the method of selective catalytic reduction (SCR). In that method, nitrogen oxide components in the exhaust gas are converted, with the reducing agent, into harmless components such as nitrogen, water and carbon dioxide. Ammonia is preferably used as a reducing agent for that purpose.

In particular, in the case of mobile internal combustion engines, ammonia is stored not directly but rather in the form of a reducing agent precursor. Such a reducing agent precursor may, for example, be urea, and in particular a urea-water solution. A urea-water solution with a urea content of 32.5% is already widely available under the trademark AdBlue.

In order to deliver the reducing agent precursor from a tank provided therefor into an exhaust-gas treatment device, a delivery device is generally required. Delivery devices with pulsatingly operating delivery pumps such as, for example, piston pumps or diaphragm pumps, have become established for reasons of reliability and/or costs. A disadvantage of pulsatingly operating delivery pumps (that is to say, in particular, intermittently operating delivery pumps or delivery pumps which deliver through the use of a stroke movement) is that they generate a delivery noise. However, for comfort in a motor vehicle, it is desirable for the delivery of the reducing agent to take place with the least noise possible.

Furthermore, high dosing accuracy of the supplied reducing agent into the exhaust-gas treatment device is desirable. That is the case firstly because an exact predefined quantity of reducing agent should be supplied into the exhaust-gas treatment device for the conversion of the pollutant constituents in the exhaust gas, and secondly because the consumption of reducing agent during the operation of the exhaust-gas treatment device should be as low as possible. The consumption of supplied reducing agent represents a cost factor for the operation of the motor vehicle. Furthermore, the reducing agent constitutes an additional operating medium which the user of a motor vehicle must replenish separately. It is often sought by the manufacturers of motor vehicles to dimension the reducing agent reservoir in a motor vehicle so as to be sufficient for the entire operating interval of the motor vehicle between two workshop or garage intervals. The user of the motor vehicle is then not burdened with replenishing the reducing agent stored in the motor vehicle.

SUMMARY OF THE INVENTION

It is accordingly an object of the invention to provide a device for delivering reducing agent and a motor vehicle having the device, which overcome the hereinafore-mentioned disadvantages and at least partially solve the highlighted technical problems of the heretofore-known devices and vehicles of this general type. It is sought, in particular, to propose a device for delivering reducing agent which is particularly inexpensive, quiet and/or accurate with regard to dosing. In this case, it is sought, in particular, to specify a configuration, which is relatively independent of the pump model, for reducing noises through the delivery lines of the reducing agent, which configuration can thus be easily and inexpensively applied equally to a multiplicity of different pump models.

With the foregoing and other objects in view there is provided, in accordance with the invention, a device for delivering reducing agent from a tank to a metering unit. The device comprises a delivery line leading from the tank to the metering unit in a delivery direction, and a pulsatingly acting delivery pump configured to deliver the reducing agent through the delivery line from the tank to the metering unit in the delivery direction. The delivery line has at least two separate ducts in regions downstream of the delivery pump in the delivery direction and the ducts form flow paths exhibiting different propagation or transit times for the reducing agent.

In this case, the expression "reducing agent," in particular, also encompasses a reducing agent precursor or a reducing agent precursor solution.

The "pulsatingly" operating delivery pump is preferably a diaphragm pump or a piston pump in which a movable delivery piston raises the energy required for the delivery, and the delivery direction of the pump is predefined through the use of corresponding valves. Therefore, through the use of the delivery pump, the quantity of reducing agent to be delivered is moved in a plurality of (relatively small) partial quantities defined by the stroke volume or the individual delivery quantity of the diaphragm or piston. As a result, the delivery pump performs a plurality or multiplicity of such working steps with a cycle frequency, and the delivery pump causes reducing agent to flow into the delivery line in a pulsed, in particular rapidly intermittent manner.

The delivery line is preferably a rigid line, composed for example of metal and/or plastic. The delivery line may also be rigid in regions and flexible in regions. Within the delivery line, or through the use of the delivery line, it is now possible for the pressure pulse which is introduced through the pulsatingly added delivery medium, and/or the body-borne noise, to propagate and constitute a source for noise at various locations. In particular, in order to reduce the introduced pressure pulses through the use of the pulsed metering of the reducing agent, it is now achieved, with the provision of ducts which are separate in regions, that the partial quantities of reducing agent which flow (simultaneously) through the ducts at least partially reduce the pressure pulse itself when brought together.

The at least two separate ducts may also have a multiplicity of ducts of different lengths. It is, for example, possible for more than 3, preferably more than 5 and, in particular, also more than 10 different separate ducts to be formed. In this case, "flow paths" means, in particular, flow paths through the ducts running substantially in parallel from the tank and/or the delivery pump to the metering unit.

A "propagation time" is to be understood to mean the time taken by a pressure pulse of the reducing agent to travel along the respective flow path through the ducts (for example at the delivery rate of the delivery pump suitable or predefined for operation). Consequently, a flow of the reducing agent is divided into the separate ducts at a first location, and is subsequently merged again, wherein one partial flow is separated from another partial flow for a longer period of time (or is decelerated) and consequently, at the merging point, the (previously identical) pressure pulses are now offset (in terms of time). The intensity of the pressure pulse, and thus also the generation of noise, are thus reduced.

In accordance with another particularly advantageous feature of the device of the invention, downstream of the delivery pump and upstream of the at least two separate ducts in the delivery direction, there is a common pump outflow duct from which the at least two separate ducts branch off, and downstream of the at least two separate ducts and upstream of the metering unit in the delivery direction, there is a common collecting duct into which the at least two separate ducts lead. The overall cross section of the at least two separate ducts preferably corresponds to the cross section of the pump outflow duct and of the common collecting duct. It is consequently proposed herein, in particular, that a joint separation and/or collection of the partial flows is provided in order to keep the technical outlay as low as possible. However, in order to provide for an adaptation of such a duct system to several different pump models, it may also be expedient for at least a part of the ducts to branch off and/or converge at different locations of the delivery line (offset with respect to one another).

In accordance with a further advantageous feature of the device of the invention, the at least two separate ducts are configured in such a way that the different propagation times of the flow paths are suitable for at least partially leveling out pressure fluctuations generated by the delivery pump through the use of interference. The pulsatingly acting delivery pump typically generates a delivery flow of reducing agent which is pulsed (has significant pressure fluctuations). Through the use of the at least two separate ducts, the common delivery flow of the delivery pump is divided into at least two individual partial flows. As a result of the different propagation times of the flow paths for the reducing agent through the individual ducts, the phase of the pulsating flow generated by the pump experiences a shift between the individual ducts. When the individual ducts are now merged with one another again in a common collecting duct, the different pulsation waves of the partial flows from the different ducts can at least partially cancel one another out. In this case, in particular, (at least partial) destructive interference of the pressure waves propagating transversally in the delivery line, which pressure waves are introduced by the pulsatingly acting delivery pump, is achieved.

In accordance with an added particularly preferable feature of the device of the invention, the at least two separate ducts form flow paths of different lengths. Different propagation times of the flow paths for the reducing agent can be realized in this way.

This is, however, only one possible way of realizing different propagation times through the separate ducts. Alternatively or in addition, the different ducts may have, at least in regions and/or at least partially, devices for flow acceleration and/or devices for flow deceleration. Devices for flow deceleration may, for example, be cross-sectional widenings in a duct. Devices for flow acceleration may, for example, be cross-sectional constrictions in a duct.

In accordance with an additional advantageous feature of the device of the invention, the delivery line is formed by an internal line portion in the device and by an external line portion outside the device, and the at least two separate ducts are a constituent part of the internal line portion. The device is normally constructed in the manner of a module encapsulated in a housing. A delivery line which has a suitable length and through which the reducing agent is transported from the device to the metering unit, may be connected to the module. The device preferably always has an identical construction for different vehicle types, whereas the length of the delivery line can be varied depending on the installation position of the device and of the tank in the motor vehicle. In this case, too, one region of the delivery line is however already disposed within the device, directly downstream of the delivery pump in the delivery direction. On the device there is a line connection to which a reducing agent line can be connected, for example through the use of a coupling. That portion of the delivery line which is disposed within the device is referred to herein as an internal line portion, whereas that portion of the delivery line which is formed in the connected transport line is referred to as an external line portion. It is particularly advantageous for the at least two separate ducts to be formed within the internal line portion, because in this way it is possible for a generation of noise to already be prevented at an early stage.

In accordance with yet another feature of the device of the invention, the delivery line is formed by an internal line portion in the device and by an external line portion outside the device, and the external line portion is formed at least partially by a tube composed of hard plastic or metal. The hard plastic may, for example, be polypropylene (PP), polyethylene (PE), in particular high density polyethylene (HDPE), polyamide (PA) or polyethylene terephthalate (PTFE). Aluminum or steel, in particular high-grade steel, may be used, for example, as metals for the tube. Lines composed of hard plastic and lines composed of metal are substantially rigid.

Such tubes are thus capable of delivering reducing agent substantially without pressure losses even over great distances. It is, however, disadvantageous that such hard plastic lines have only a small amount of flexibility, and can specifically be jointly responsible for the generation and/or transmission of noise. By contrast, flexible lines lead to vibration damping, because a flexible line acts as a pressure accumulator. For this reason, the use of the device with the at least two separate ducts for leveling out pressure fluctuations through interference is particularly effective specifically when hard plastic lines are used as a constituent part of external line portions.

Lines composed of metal and, in particular, lines composed of steel or high-grade steel are furthermore also resistant to high temperatures and can thus be used, in particular, for transporting reducing agent into the direct vicinity of an exhaust line and/or to an exhaust-gas treatment device.

In accordance with yet a further advantageous feature of the device of the invention, a pressure sensor is formed or provided in the vicinity of the metering unit. In order to provide precise dosing of the reducing agent quantity supplied by the delivery unit, it is generally necessary for the pressure in the direct vicinity of the metering unit to be known exactly. A metering unit normally controls the supplied quantity of reducing agent on the basis of the opening time of an injector disposed in the metering unit. In this case, the supplied quantity of reducing agent is defined by the opening time, the construction of the injector and the pressure in the metering unit. Due to the great external line portion length, often necessitated by the construction, it may be the case that the pressure which actually prevails at the metering unit deviates, sometimes considerably, from the pressure prevailing in the delivery unit. This results on one hand from the flexibility of the external line portion and the flow resistance arising therein. On the other hand, the propagation time of the reducing agent through the external line portion has the effect that pressure fluctuations from the device pass to the metering unit in a time-offset manner. For this reason, it is advantageous for a pressure sensor to be disposed in the direct vicinity of the metering unit. In this case, it can be expected, in particular, that pressure fluctuations generated by the pulsatingly operating delivery pump are relatively small.

In accordance with yet an added feature of the device of the invention, the device has a pulsation-damping component which has two connections through which it can be connected to the delivery line, and the at least two separate ducts are formed within the pulsation-damping component. This means, in particular, that within the device, there is a separate component through which the damping is performed. The pulsation-damping component may also be installed retroactively into delivery devices by virtue of the delivery line within the device being divided, and the pulsation-damping component being inserted into the divided delivery line.

In accordance with yet an additional advantageous feature of the device of the invention, the at least two separate ducts each have one inlet end and one outlet end, and the at least two separate ducts are separated from one another by a wall which, in the region of the outlet end, has at least one common wall portion which is permeable to reducing agent. In the case of such a configuration, in the region of the inlet end, there is preferably provided, in at least one of the at least two separate ducts, a line elongation and/or device for flow acceleration and/or device for flow deceleration, by way of which the interference between the two reducing agent partial flows in the at least two separate ducts can be generated. As a result of the common wall portion, which is permeable to reducing agent, of the two ducts in the region of the outlet end, an equalization of the flows and of the pressures in the at least two separate ducts already takes place within the at least two separate ducts a short distance upstream of the outlet end. It has been found that such an equalization of the pressure flows in the at least two separate ducts permits a particularly efficient reduction of the pulsation in the flow. The permeable common wall portion is thus preferably formed so as to adjoin the common collecting chamber and preferably includes a wall which comes into contact at both sides with the partial flows and which has a multiplicity of openings, pores, meshes or the like which permit an exchange of partial flows (correspondingly to the pressure levels presently prevailing in each of the ducts).

With the objects of the invention in view, there is concomitantly provided a motor vehicle, comprising an internal combustion engine, an exhaust-gas treatment device for purification of exhaust gases of the internal combustion engine, the exhaust-gas treatment device having a metering unit for metering reducing agent into the exhaust gas, and the metering unit being supplied with reducing agent by a device according to the present invention.

In particular, the following method is thus implemented in this case:
a) delivery of liquid reducing agent through the use of a pulsatingly acting delivery pump into a delivery line, in such a way that pressure pulses are generated;
b) formation of at least two partial flows of the reducing agent;
c) guidance of the at least two partial flows of the reducing agent with different propagation times to a collecting point; and
d) reduction of the pressure pulses through interference of the partial flows of the reducing agent.

The method may be realized, in particular, with the device according to the invention described herein. It is likewise possible for the method steps explained in conjunction with the device according to the invention to be applied or supplemented herein.

Other features which are considered as characteristic for the invention are set forth in the appended claims, noting that the features specified individually in the claims may be combined with one another in any desired technologically meaningful way and may be supplemented by explanatory facts from the description, with further structural variants of the invention being specified.

Although the invention is illustrated and described herein as embodied in a device for delivering reducing agent and a motor vehicle having the device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
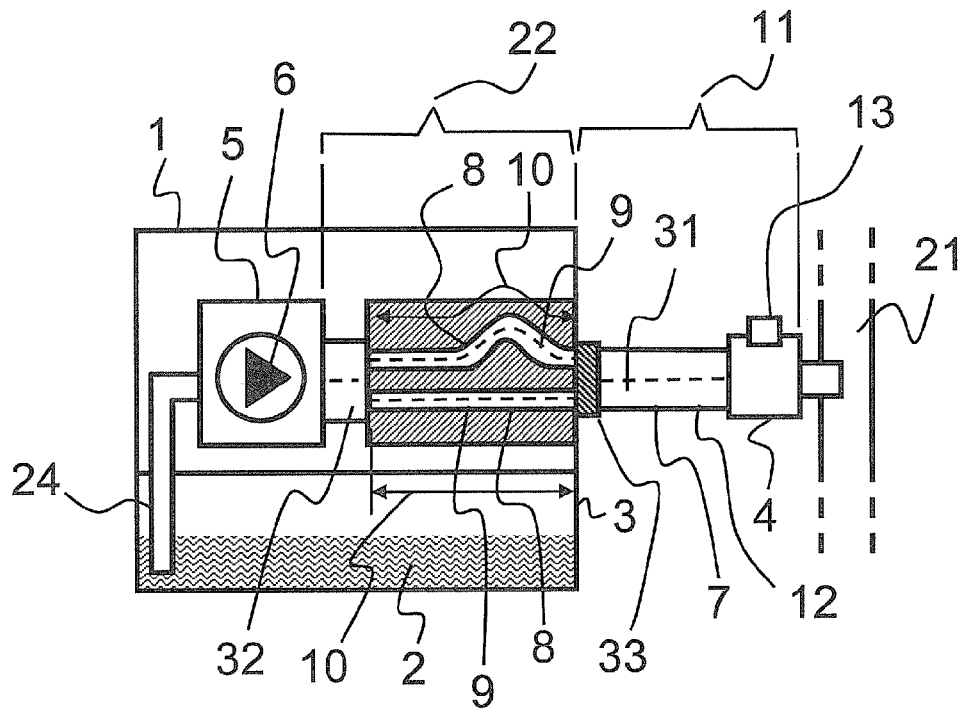
FIG. 1 is a diagrammatic, vertical-sectional view of a device with a tank and a metering unit according to the invention.

Referring now to the figures of the drawings in detail and first, particularly, to FIG. 1 thereof, there is seen a device 1 together with a tank 3 for a liquid reducing agent 2 (in this case a urea-water solution) and a metering or adding unit 4 (in this case in the form of an injector) for metering or adding the liquid reducing agent into a diagrammatically indicated exhaust-gas treatment device 21. The device 1 extracts reducing agent 2 from the tank 3 through an extraction line 24. The reducing agent 2 is then delivered by a delivery pump 5 in a delivery direction 6 towards the metering unit 4. A pump outflow duct 32 is situated firstly downstream of the delivery pump 5 in the delivery direction 6. The pump outflow duct branches into separate ducts 8 which form separate flow paths 9. One of the diagrammatically illustrated two separate ducts 8 has a greater length 10 than the other duct 8. In this way, (destructive) interference between the flows in the two ducts 8 is attained. The separate ducts 8 subsequently issue into a common collecting duct 31. Delivered reducing agent 2 passes from the collecting duct 31 to the metering unit 4. A pressure sensor 13, which is also illustrated therein, is disposed on the metering unit 4 and permits the pressure at the metering unit 4 to be precisely determined. A delivery line 7 formed from the individual line portions (pump outlet duct 32, separate ducts 8, collecting duct 31) has an internal line portion 22 which is formed within the device 1 (or a housing and/or base plate thereof). The delivery line 7 also has an external line portion 11, in this case in the form of a tube 12. The external line portion 11 can be connected to the device 1 through the use of a line connection 33.

Figure 2:
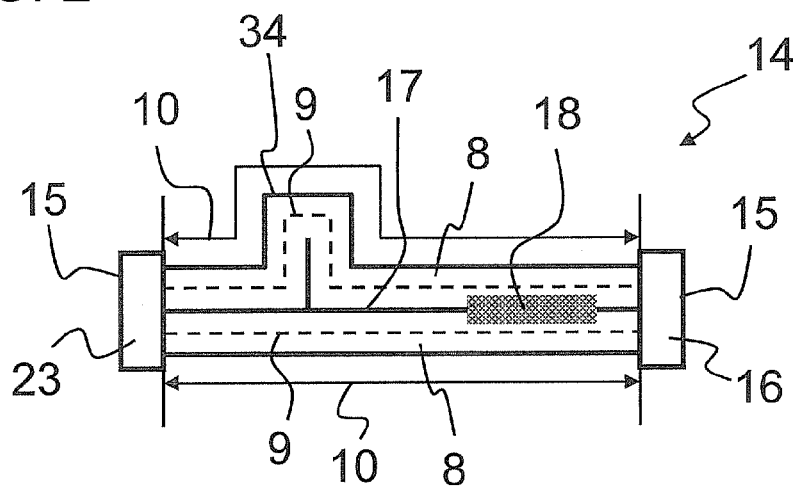
FIG. 2 is a longitudinal-sectional view of a first structural variant of a pulsation-damping component for the device.

FIG. 2 shows a separate pulsation-damping component 14 which can be coupled in and which can be installed into a device for delivering reducing agent, so that the device can reduce or even partially eliminate pulsations in a reducing agent flow in the delivery device through the use of interference. The pulsation-damping component 14 has two connections 15 with which it can be connected into a delivery line 7. One of the connections 15 forms an inlet end 23, and the other connection 15 forms an outlet end 16. At least two separate ducts 8, each of which forms one respective flow path 9 for reducing agent, run from the inlet end 23 to the outlet end 16. The flow paths 9 each have a length 10. The lengths 10 of the flow paths 9 differ. This is realized in the structural variant of FIG. 2 through the use of a flow loop 34 in one of the ducts 8.

The two ducts 8 are separated from one another by a wall 17. The wall 17 has a permeable wall portion 18, with pores or micro-openings, in the region of the outlet end 16.

Figure 3:
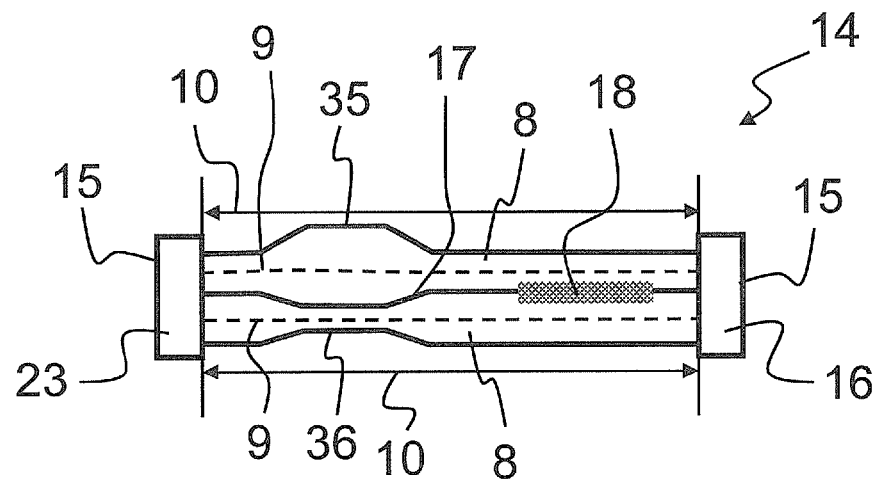
FIG. 3 is a longitudinal-sectional view of a second structural variant of a pulsation-damping component for the device.

FIG. 3 shows a further structural variant of a pulsation-damping component 14. This pulsation-damping component 14 also has two connections 15, one of which forms an outlet end 16 and the other of which forms an inlet end 23. In this case as well, two separate ducts 8, each of which form one respective flow path 9 for reducing agent, extend from the inlet end 23 to the outlet end 16. In FIG. 3, however, the two flow paths 9 have equal lengths 10. Interference between the reducing agent flows in the two separate ducts 8 is attained in this case by virtue of the reducing agent flow in one of the two ducts 8 being decelerated through the use of a cross-sectional widening 35, whereas the reducing agent flow in the other duct 8 is accelerated through the use of a cross-sectional constriction 36. The deceleration and acceleration of the reducing agent flow takes place only in regions, and separately for the partial flows.

It is also illustrated in FIG. 3 that the ducts 8 are separated from one another by (at least) one wall 17. The wall 17 has a permeable wall portion 18, in the region of the outlet end 16, through which a leveling of the reducing agent flows in the separate ducts 8 can take place.

Figure 4:
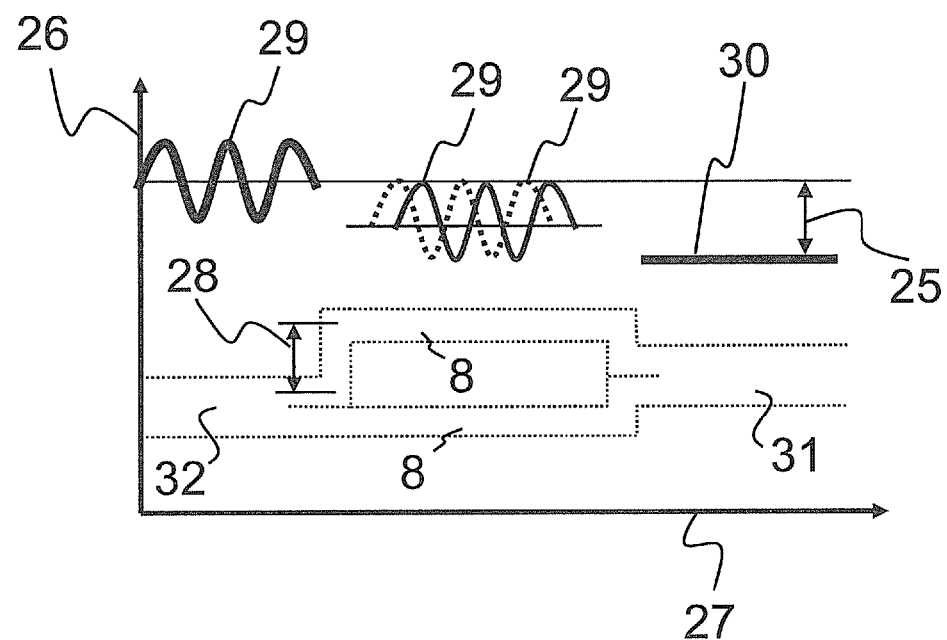
FIG. 4 is a diagram illustrating a pressure in a device according to the invention.

FIG. 4 diagrammatically shows a pressure profile in the delivery line in one variant of the device 1 according to the invention. The pressure in the delivery line is plotted on a pressure axis 26 against a position axis 27. A lower region of FIG. 4 diagrammatically shows the delivery line 7 with the pump outlet duct 32, the separate ducts 8 and the collecting duct 31. There is a length difference 28 between the two separate ducts 8. A pump pressure pulse 29 can be seen in the diagram in the region of the pump outlet duct 32. As a result of the length difference 28, the pressure pulse 29 is divided in the region of the separate ducts into two individual pump pressure pulses 29 which exhibit interference with respect to one another. When the partial flows from the two separate ducts 8 are merged again in the collecting duct 31, only a reducing agent flow with a substantially leveled pressure 30 (as shown) or at least with a smaller pressure amplitude, then remains. Due to friction within the device 1, the mean pressure level decreases by a pressure loss 25, from the pump outflow duct 32 through the separate ducts 8 to the collecting duct 31.

Figure 5:
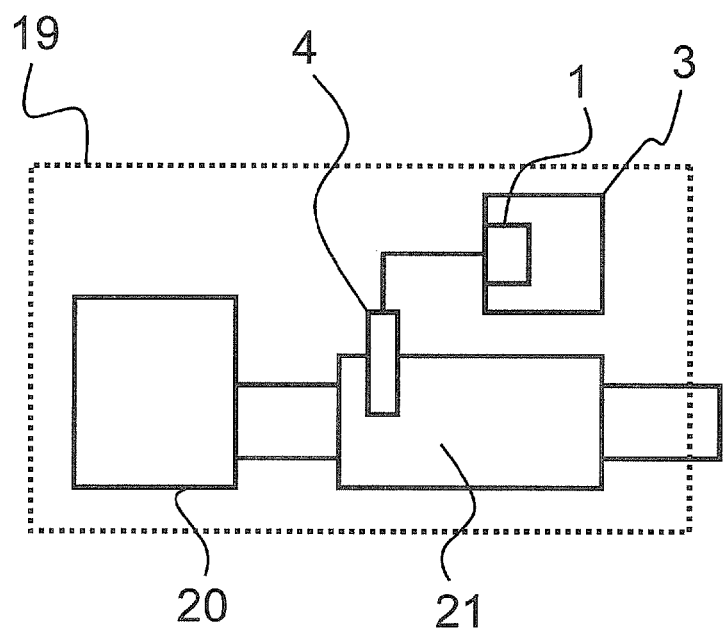
FIG. 5 is a vertical-sectional view of a motor vehicle having a device according to the invention.

FIG. 5 shows a motor vehicle 19 having an internal combustion engine 20 and having an exhaust-gas treatment device 21 for the purification of exhaust gases of the internal combustion engine 20. The exhaust-gas treatment device 21 has a metering unit 4 for the supply of reducing agent into the exhaust-gas treatment device 21. The metering unit 4 may, for example, have an injector. The metering unit 4 is supplied with reducing agent from a tank 3 by a device 1 according to the invention.

The device described herein at least partially solves the technical problems highlighted in conjunction with the prior art. In particular, the device permits a delivery of reducing agent which is particularly inexpensive, quiet and/or accurate with regard to dosing. In this case, in particular, there is specified a configuration, which is relatively independent of the pump model, for reducing noises through the delivery lines for the reducing agent. This configuration can thus be easily and inexpensively applied equally to a multiplicity of different pump models.

The invention claimed is:

1. A device for delivering reducing agent from a tank to a metering unit, the device comprising:
   a delivery line leading from the tank to the metering unit in a delivery direction;
   a pulsatingly acting delivery pump configured to deliver the reducing agent through said delivery line from the tank to the metering unit in said delivery direction;
   said delivery line having at least two separate ducts in regions downstream of said delivery pump in said delivery direction;
   said at least two separate ducts forming flow paths exhibiting different propagation times for the reducing agent; and
   said at least two separate ducts each having one inlet end and one outlet end;
   a wall separating said at least two separate ducts from one another; and
   said wall having at least one wall portion, in a vicinity of said outlet ends of said at least two separate ducts, being common to said at least two separate ducts and permeable to the reducing agent.

2. The device according to claim 1, which further comprises:
   a common pump outflow duct disposed downstream of said pump and upstream of said at least two separate ducts in said delivery direction, said at least two separate ducts branching off from said common pump outflow duct; and
   a common collecting duct disposed downstream of said at least two separate ducts and upstream of said metering unit in said delivery direction, said at least two separate ducts issuing into said common collecting duct.

3. The device according to claim 1, wherein said at least two ducts are configured to make said different propagation times of said flow paths suitable for at least partially leveling out pressure fluctuations generated by said delivery pump using interference.

4. The device according to claim 1, wherein said flow paths formed by said at least two separate ducts have different lengths.

5. The device according to claim 1, wherein said delivery line is formed by a first line portion connected to a second line portion downstream of said first line portion in said delivery direction, and said at least two separate ducts are a constituent part of said first line portion.

6. The device according to claim 1, wherein said delivery line is formed by a first line portion connected to a second line portion downstream of said first line portion in said delivery direction, said second line portion formed at least partially by a tube composed of hard plastic or metal.

7. The device according to claim 1, wherein a pressure sensor is disposed in a vicinity of the metering unit.

8. The device according to claim 1, which further comprises a pulsation-damping component having two connections configured to connect said pulsation-damping component to said delivery line, said at least two separate ducts being formed within said pulsation-damping component.

9. A motor vehicle, comprising:
an internal combustion engine;
an exhaust-gas treatment device for purification of exhaust gases of said internal combustion engine;
said exhaust-gas treatment device having a metering unit for metering reducing agent into the exhaust gas; and
said metering unit being supplied with reducing agent by a device according to claim 1.

10. A device for delivering reducing agent from a tank to a metering unit, the device comprising:
a delivery line leading from the tank to the metering unit in a delivery direction;
a pulsatingly acting delivery pump configured to deliver the reducing agent through said delivery line from the tank to the metering unit in said delivery direction;
said delivery line having at least two separate ducts in regions downstream of said delivery pump in said delivery direction;
said at least two separate ducts forming flow paths exhibiting different propagation times for the reducing agent;
at least one duct of said at least two separate ducts having, at least in regions thereof, a device for flow deceleration being a cross-sectional widening of said at least one duct; and
at least one other duct of said at least two separate ducts having, at least in regions thereof, a device for flow acceleration being a cross-sectional constriction of said at least one other duct.

11. The device according to claim 10, wherein:
said at least two separate ducts each have one inlet end and one outlet end;
a wall separates said at least two separate ducts from one another; and
said wall has at least one wall portion, in a vicinity of said outlet ends of said at least two separate ducts, being common to said at least two separate ducts and permeable to reducing agent.

12. A motor vehicle, comprising:
an internal combustion engine;
an exhaust-gas treatment device for purification of exhaust gases of said internal combustion engine;
said exhaust-gas treatment device having a metering unit for metering reducing agent into the exhaust gas; and
said metering unit being supplied with reducing agent by a device according to claim 10.

* * * * *